2,952,634

HEAT-RESISTANT DRILLING FLUID

Jan Lolkema and Geert Moes, Hoogezand, Netherlands, assignors to W. A. Scholten's Chemische Fabrieken N.V., Groningen, Netherlands, a Dutch limited-liability company of the Netherlands No Drawing. Filed Sept. 12, 1956, Ser. No. 609,403

Claims priority, application Netherlands Sept. 14, 1955

2 Claims. (Cl. 252—8.5)

The invention relates to drilling fluids of the water-in-oil emulsion type, consisting of water and oil with the usual solid substances, which drilling fluid is suitable for making deep wells.

It is known that in drilling operations for the recovery of mineral oil or natural gas the use of water-in-oil emulsions as drilling fluids presents several advantages over that of the conventional mud fluids. An important advantage of such drilling emulsions is that the pores and channels of the oil-containing formation are not shut off by or filled with entering water, in consequence of which the flow of oil can be obstructed to a considerable degree or even prevented altogether. Another important advantage of water-in-oil emulsion fluids is formed by the fact that in drilling through highly hydrophile clay formations no swelling and caving of the walls of the well need be feared, since owing to the circumstance that oil forms the external phase of the emulsion the hydratable clay practically does not come into contact with water, if at all.

For the preparation of such drilling emulsions, emulsifiers of different types have already been proposed, including e.g. water-soluble polysaccharides or polysaccharide derivatives, polyvalent metal salts of higher—preferably unsaturated—fatty acids, and partial esters of polyvalent alcohols and higher fatty acids.

Now it has been found that excellent and extremely heat-resistant drilling emulsions of the water-in-oil type, containing one or more of the usual plastering and/or loading materials, are obtained if the stabilizer used is an emulsifier which is soluble in oil, but practically insoluble in water and which is of such a nature that upon 20 cm.$^3$ of a 0.25 percent solution of the emulsifier in neutral, freshly refined arachis oil being subjected to the steam emulsion test, the time required for the separation of 5 cm.$^3$ of one of the phases of the emulsion at a temperature of 93–95° C. is at least 20 minutes.

This steam emulsion test has been described in detail for mineral oils in A.S.T.M. Standards Petroleum Products and Lubricants, September 1937, Am. Soc. for Testing Materials, D157–36, page 124.

It is very suitable for determining the heat-stability of emulsions of the water-in-oil type.

According to the invention use is preferably made of an emulsifier consisting of a condensation and/or polymerization product soluble in oil, but practically insoluble in water, the molecule of which product contains the radicals of a higher fatty acid and a polyvalent alcohol. Emulsifiers of this type are obtained by heating drying oils, preferably with oxidation, until the reaction product satisfies the criterion set. Products of this kind are described, inter alia, in the Dutch patent specification No. 12,071, corresponding to British patent specification No. 187,298.

The condensation and/or polymerization product may also contain the radical of a polybasic acid in the molecule. Examples of suitable polybasic acids are: maleic acid, fumaric acid, sebacic acid and phosphoric acid. This type of emulsifiers has been described e.g. in the French patent specification No. 942,671, corresponding to United States Patent No. 2,552,706.

The emulsifiers referred to above may have been obtained both with and without the aid of catalysts. Thus, for example, by the heating of linseed oil with maleic anhydride, both in the presence and in the absence of an organic peroxide, it is possible to obtain products satisfying the requirements as to their emulsifying power.

Generally the emulsions obtained with these emulsifiers in the said steam emulsion test are appreciably more stable than the minimum indicated above; thus the separation of one of the phases upon application of the steam emulsion test after 20 minutes as a rule is less than 0.5 cm.$^3$.

In many cases it presents advantages to apply the emulsifiers used according to the invention in combination with other emulsifiers swelling or soluble in oil, such as oil-soluble petroleum sulphonates.

It has been found that the drilling emulsions prepared according to the invention have exceptional properties. The emulsions not only have excellent heat-stability, but are also very stable to prolonged pumping at raised pressures and elevated temperatures. Moreover the drilling emulsions according to the invention are stable in the presence of electrolytes, so that in drilling through salt formations their good properties are not lost. If desired, the emulsions according to the invention can therefore be prepared with an electrolyte, such as calcium or sodium chloride. This not only involves the advantage that for the preparation of comparatively heavy emulsions the specific gravity of the water phase can be increased by addition of an electrolyte, but also that the risk of swelling of hydrophile clay formations owing to possible filtration losses of the fluid in the walls of the well is further reduced.

Stable and heat-resistant emulsions are obtained already with comparatively low percentages of emulsifier(s), viz. 0.1–5 percent by weight, calculated on the total weight of the emulsion.

The quantity of water which the emulsion may contain may vary widely, but the most stable emulsions are obtained when the quantity of water is between 20 and 50 percent by volume of the emulsion. It has been found that at very high percentages of water, e.g. 60 percent by volume or more, the emulsions according to the invention are less stable and as a rule have too high a viscosity with the percentages of emulsifier suitable from practical considerations.

The procedure in the preparation of a drilling emulsion according to the invention is preferably as follows. The emulsifier or the combination of emulsifiers or a solution thereof in oil is dissolved at ordinary or elevated temperatures in the oil to be used for the preparation of the emulsion. Subsequently, with a view to adjusting the specific gravity and enhancing the plastering properties, a loading material such as e.g. barium sulphate is dispersed in the oil. The required percentage of water is then gradually added to the oil phase with vigorous stirring, upon which the emulsion obtained can be homogenized in the known manner.

Instead of from water it is also possible to start from an electrolyte solution, e.g. a saturated sodium chloride solution, or from a conventional mud fluid. The latter fluid may contain the familiar water-soluble dispersing agents and/or stabilizers, such as starch, water-soluble starch or cellulose ethers, which substances as a rule exercise a favourable influence on the stablity of the water-in-oil emulsion.

The oil phase employed may be any refined or nonrefined mineral oil commonly used in practice for the production of drilling fluids, e.g. crude oil, diesel oil or gasoline. Oils of vegetable or animal origin are also suitable for this purpose.

Examples of suitable loading materials are barium sulphate, clay, and further iron oxides and various metal sulphides. Though the loading materials as a rule enhance the plastering capacity of the emulsion, it is desirable to add to the emulsion a small amount of a plastering material, such as soft asphalt. Suitable plastering materials, besides asphalt, are other high-molecular products swelling or soluble in oil, such as benzyl starch, starch palmitate, starch stearate, benzyl cellulose, and the like.

The invention will now be elucidated more in detail with reference to a number of examples.

*Example I*

Six parts by weight of an emulsifier, prepared according to Example I of the French patent specification No. 942,671 from the monoglyceride of arachis oil and sebacic acid, and 8 parts by weight of soft asphalt are dissolved in 200 parts by volume of diesel oil. Subsequently 120 parts by volume of water are slowly added, with vigorous stirring, to the oil containing the emulsifier and the plastering material, upon which the emulsion formed is homogenized in the known manner. The plastering properties of the emulsion obtained were tested in a Baroid low-pressure plastering apparatus at a pressure of 7 kg./cm.$^2$ according to the directions of the American Petroleum Institute (A.P.I. Code No. 29, third edition, published May 1950). The filtration loss after 30 minutes was found to be 10 cm.$^3$ of emulsion. By the use of larger quantities of soft asphalt the filtration loss can be appreciably reduced. If with the above mentioned drilling fluid 40 instead of 8 parts by weight of soft asphalt are taken, a drilling emulsion is obtained for which the filtration loss at a pressure of 7 kg./cm.$^2$ after 30 minutes is 0 cm.$^3$. When 20 cm.$^3$ of a 0.25 percent solution in neutral, freshly refined arachis oil of the emulsifier here used are tested by the steam emulsion test, an emulsion is obtained which at a temperature of 93–95° C. after 20 minutes separates off 0.75 cm.$^3$ of oil and no water.

*Example II*

Five parts by weight of an emulsifier, prepared according to Example II of the French patent specification No. 942,671 from arachis oil and maleic anhydride, and 10 parts by weight of soft asphalt are dissolved in 200 parts by volume of diesel oil. Subsequently 160 parts by weight of barium sulphate are suspended in the oil, upon which, with vigorous stirring, 133 parts by volume of a calcium chloride solution containing 600 parts by weight of anhydrous salt per litre are gradually added to the suspension. The emulsion thus formed is homogenized, as a result of which an extremely stable water-in-oil emulsion with good plastering properties is obtained. The filtration loss of this drilling fluid, determined in a Baroid low-pressure plastering apparatus at a pressure of 7 kg./cm.$^2$, after 30 minutes is only 0.3 cm.$^3$ of emulsion, while the thickness of the plaster cake is about 1 mm.

When 20 cm.$^3$ of a 0.25 percent solution in neutral, freshly refined arachis oil of the emulsifier used in this example are tested by the steam emulsion test, after 20 minutes' standing at a temperature of 93–95° C. only 0.5 cm.$^3$ of oil and no water is separated off.

*Example III*

This example relates to the conversion of a bentonite-containing brine mud into a drilling emulsion of the water-in-oil type by means of an emulsifier according to the invention. The brine mud employed consists of a saturated sodium chloride solution containing, per 350 parts by volume of solution, 7 parts by weight of Zeogel (a type of bentonite resistant to brine) and 1 part by weight of a carboxymethyl starch soluble in cold water. The specific gravity of this brine mud is 1.17. Ten parts by weight of a 50 percent solution in mineral oil of an emulsifier obtained by polymerization and oxidation of soybean oil are dissolved in 200 parts by volume of diesel oil. Upon this, 145 parts by weight of barium sulphate are suspended in the diesel oil. Subsequently 100 parts by volume of brine mud of the above mentioned composition are gradually added to the diesel oil containing the emulsifier and the loading material, the mixture being vigorously stirred all the time. After the mixing of the two phases the emulsion formed is pumped a few times more with the aid of a gear pump. The drilling emulsion thus obtained is very stable and has excellent plastering properties. The filtration loss, determined in a Baroid low-pressure plastering apparatus at a pressure of 7 kg./cm.$^2$, after 30 minutes is 1 cm.$^3$ of emulsion, while the thickness of the plaster cake formed is less than 1 mm.

When 20 cm.$^3$ of a 0.25 percent solution in neutral, freshly refined arachis oil of the emulsifier used in the preparation of the above mentioned drilling emulsion and obtained by polymerization and oxidation of soybean oil are tested by the steam emulsion test, an emulsion is obtained which at a temperature of 93–95° C. after 20 minutes' standing separates off 1.5 cm.$^3$ of oil and 0 cm.$^3$ of water.

*Example IV*

One hundred parts by weight of an emulsifier, prepared according to the directions of Example I of the French patent specification No. 942,671 from the monoglyceride of palm oil and sebacic acid, are thoroughly mixed with 40 parts by weight of an oil-soluble petroleum sulphonate and 140 parts by weight of mineral oil. Eight parts by weight of the 50 percent solution of the mixture of emulsifiers thus obtained are dissolved in 200 parts by volume of diesel oil, upon which 160 parts by weight of barium sulphate are suspended in the oil. To this barytes suspension are slowly added 86 parts by volume of a calcium chloride solution containing 600 parts by weight of anhydrous salt per litre of water, the suspension being vigorously stirred all the time. After the mixing of the two phases the water-in-oil emulsion formed is homogenized. The water-in-oil emulsion thus prepared has a specific gravity of about 1.27 and a viscosity of 14 centipoises at 600 r.p.m., determined with the Stormer viscosimeter. The drilling emulsion obtained not only is very stable, but is also found to have good plastering properties. Thus the filtration loss of the emulsion described, when tested in a low-pressure plastering apparatus according to the directions of the A.P.I. at a pressure of 7 kg./cm.$^2$, after 30 minutes is only 1.3 cm.$^3$ of emulsion, while the plaster cake formed has a thickness of about 0.7 mm.

Upon application of larger quantities of calcium chloride solution than described above, stable water-in-oil emulsions with good plastering properties are likewise obtained. Thus an emulsion prepared with 200 instead of 86 parts by volume of the said calcium chloride solution, but under otherwise identical conditions, after 30 minutes at a pressure of 7 kg./cm.$^2$ gives a total filtration loss of 2.1 cm.$^3$ (1.5 cm.$^3$ of emulsion and 0.6 cm.$^3$ of oil), while the thickness of the plaster cake is about 0.9 mm. The specific gravity of the latter drilling fluid is about 1.25, while the viscosity is 52 centipoises, measured in the Stormer viscosimeter at 600 r.p.m.

When 20 cm.$^3$ of a 0.25 percent solution in neutral, freshly refined arachis oil of the emulsifier prepared from the monoglyceride of palm oil and sebacic acid are tested by the steam emulsion test, an emulsion is obtained which after 20 minutes' standing at a temperature of 93–95° C. separates off only 0.25 cm.³ of oil and no water at all.

*Example V*

A drilling fluid which has been prepared according to the directions of Example IV, using 110 instead of 86 parts by volume of the calcium chloride solution mentioned in this example, is pumped for 8 hours with the aid of a Sihi pump at a temperature of 80–90° C. The filtration loss after 30 minutes at 7 kg./cm.², determined in a Baroid low-pressure plastering apparatus, was 1.1 cm.³ at the beginning and 2.1 cm.³ at the end of the heating and pumping, while the plaster cake formed had a thickness of about 1 mm. in both cases. The viscosity of the drilling emulsion before and after the treatment at elevated temperature was 28 and 43 centipoises respectively, measured with the Stormer viscosimeter at 600 r.p.m.

The filtration loss of the drilling emulsion treated at 80–90° C. was also determined in a Baroid high-pressure plastering apparatus at a pressure of 35 kg./cm.² and a temperature of 90° C. The total filtration loss in this case was 9 cm.³, which corresponds to a loss of drilling fluid of 0.3 cm.³/cm.² of filtration area.

The thickness of the plaster cake formed was also only 1 mm. under these extreme conditions of temperature and pressure. From the above it is thus evident that the drilling emulsion tested is particularly stable to prolonged pumping at elevated temperatures.

What we claim is:

1. A heat-resistant drilling fluid of the water-in-oil emulsion type for drilling deep wells consisting of an oil base, up to 60% by volume of water, finely dispersed solid materials suspendable in the emulsion and an oil-soluble emulsifier capable of forming heat-stable water-in-oil emulsions requiring at least 20 minutes for separation of 5 cm. of oil as measured by the A.S.T.M. steam emulsion test, said emulsifier being prepared by condensation of a higher fatty acid glyceride and an aliphatic dicarboxylic organic acid.

2. The method of drilling a well comprising circulating in said well the heat-resistant drilling fluid defined by claim 1.

References Cited in the file of this patent

UNITED STATES PATENTS

| | | |
|---|---|---|
| 2,552,706 | Bertram | May 8, 1951 |
| 2,661,334 | Lummus | Dec. 1, 1953 |
| 2,689,219 | Menaul | Sept. 14, 1954 |
| 2,793,188 | Swain et al. | May 21, 1957 |
| 2,793,996 | Lummus | May 28, 1957 |

FOREIGN PATENTS

| | | |
|---|---|---|
| 942,671 | France | Mar. 5, 1957 |

UNITED STATES PATENT OFFICE
CERTIFICATION OF CORRECTION

Patent No. 2,952,634 September 13, 1960

Jan Lolkema et al.

It is hereby certified that error appears in the above numbered patent requiring correction and that the said Letters Patent should read as corrected below.

Column 2, line 1, for "furmaric" read -- fumaric --; column 6, line 8, for "5 cm." read -- 5 cc. --.

Signed and sealed this 15th day of August 1961.

(SEAL)
Attest:

ERNEST W. SWIDER
Attesting Officer

DAVID L. LADD
Commissioner of Patents